United States Patent [19]

Vacher

[11] Patent Number: 5,796,217
[45] Date of Patent: Aug. 18, 1998

[54] PICTURE DISPLAY APPARATUS WITH A SOFT-START DEVICE

[75] Inventor: Pierre Vacher, Suresnes, France

[73] Assignee: U.S. Philips Corporation, New York, N.Y.

[21] Appl. No.: 792,047

[22] Filed: Feb. 3, 1997

[30] Foreign Application Priority Data

Feb. 7, 1996 [FR] France ................. 96 01479

[51] Int. Cl.[6] .................. G09G 1/04; H01J 29/70
[52] U.S. Cl. ..................... 315/408; 315/387
[58] Field of Search .................. 315/408, 387, 315/389

[56] References Cited

U.S. PATENT DOCUMENTS 3,793,553  2/1974  Sexton, Jr. et al. ............. 315/388
5,142,206  8/1992  Gries ........................ 315/408

FOREIGN PATENT DOCUMENTS 2082413  8/1981  United Kingdom .

*Primary Examiner*—Gregory C. Issing
*Attorney, Agent, or Firm*—Edward W. Goodman

[57] ABSTRACT

The line-sweep power circuit is of the known type, in which the base current of the switching transistor (TP) is automatically maintained by a positive feedback provided by a winding (L2) of the EHT transformer. This circuit is synchronized by a signal transmitted by an opto-coupler (DE-TC). The duty factor of the control signal transmitted by the opto-coupler is modified in a progressive manner during the transitions of a start signal (RC) so as to interrupt the conductance of the power transistor at an ever earlier instant. This may be obtained, for example, by means an integrator (4, 8) to which the load resistor (R2) of a transistor (T0) with an open collector is connected, which is driven by a line synchronizing signal.

9 Claims, 1 Drawing Sheet

5,796,217

PICTURE DISPLAY APPARATUS WITH A SOFT-START DEVICE

BACKGROUND OF THE INVENTION

1. Field Of The Invention

The invention relates to a picture display apparatus with a cathode ray tube and a device which generates a sawtooth current in a beam deflection coil, produces, by means of a transformer, different voltages required for the apparatus, and comprises, for supplying the deflection coil current, a bipolar power transistor whose base current is automatically maintained by a positive feedback provided by a winding of the transformer connected in such a sense that it supplies a voltage to the base of the power transistor which is suitable for increasing its conductance when it is already conducting, and is diverted so as to render the power transistor non-conducting during periods of time occurring at regular intervals by means of an element referred to as blocking element which is controlled by a line frequency signal.

2. Description Of The Related Art

Such a picture display apparatus is known from the document GB 2,082,413. In the circuit described in this document, the element (T1), which turns down the base current, is directly controlled by a square-wave line synchronizing signal.

SUMMARY OF THE INVENTION

It is an object of the invention to provide an apparatus in which the standby procedure does not produce any burning of the tube and suppresses any residual high tension after a stop, while the start does not produce any excess current in the line sweep circuit.

To this end, the apparatus comprises an integrator circuit having an input which is connected to a terminal which conveys a run/standby signal, and an output which conveys a voltage varying progressively during a transition of the value of the run/standby signal and is connected to an assembly which, as a function of said output voltage, varies the duty factor of the line frequency signal which controls the blocking element.

In a particular embodiment, for constituting the blocking element, the main current path of a transistor referred to as blocking transistor, controlled by said line frequency signal, extends between the base of the power transistor and a voltage reference point.

Preferably, the base of the blocking transistor is connected to the emitter of a transistor, referred to as control transistor, which is controlled by a line frequency signal and whose collector is connected via a first resistor to a power supply source, a first capacitance connecting the collector of the control transistor to the base of the power transistor.

Such a circuit allows the self-triggering of the base current of the power transistor to be started after a period of non-conductance.

Advantageously, the apparatus comprises an opto-coupler having a receiver transistor, which constitutes said control transistor, and an emitter diode which is fed with said line frequency signal.

This allows a DC separation between the line deflection coil and the other circuits of the apparatus, insulated from the line voltage.

In a particular embodiment, the emitter diode is fed by another transistor whose base is connected, by means of a second capacitance, to a source supplying a square-wave line frequency signal having an amplitude which is variable as a function of the value of the run/standby signal.

This ensures automatic limitation of the duration of conductance of the power transistor in the case of a failure in the control circuit.

In a particular embodiment, said square-wave line frequency signal, having an amplitude which is variable as a function of the value of the run/standby signal, is obtained at an open collector output of a line synchronizing signal generator, which output is connected by means of a second resistor to the output of the integrator circuit.

Advantageously, the base current of the power transistor is supplied by an arrangement having one end connected to a voltage reference point and comprising, in cascade, said transformer winding, an inductance and a diode, and having the other end connected to the base of the power transistor by means of an assembly consisting of a third resistor in parallel with a third capacitance.

Advantageously, with one of the terminals of the diode being connected to the third resistor, a fourth resistor is connected between the other terminal of the diode and the base of the power transistor.

This resistor allows the transmission of negative voltages so as to render the power transistor non-conducting.

These and other aspects of the invention will be apparent from and elucidated with reference to the embodiments described hereinafter.

DESCRIPTION OF THE PREFERRED EMBODIMENT

The invention will be described with reference to a television set, but it is also applicable to any image display apparatus, for example, a monitor.

Figure 1:
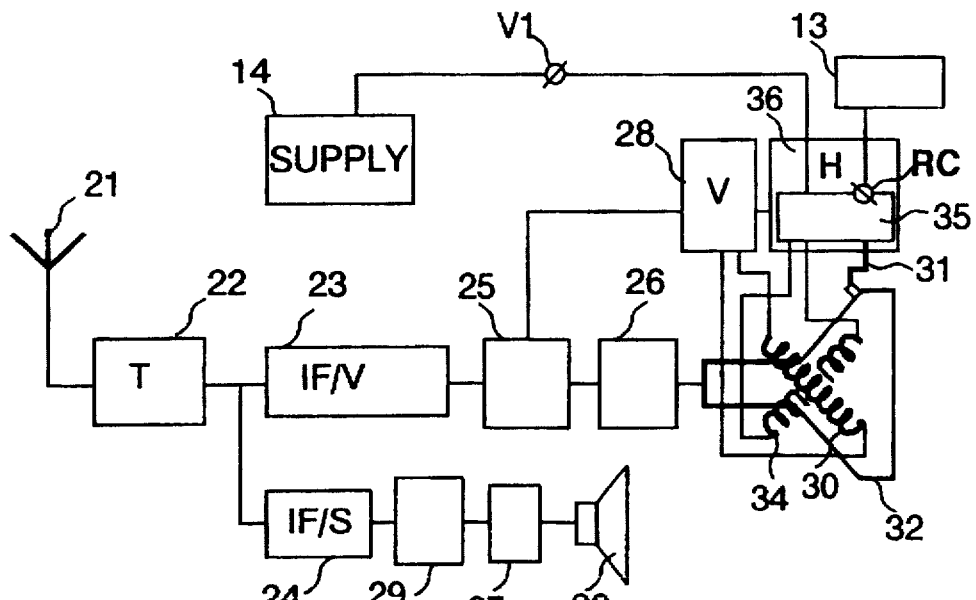
FIG. 1 shows, diagrammatically, a picture display apparatus provided with a cathode ray tube.

The television set, which is shown diagrammatically in FIG. 1, comprises a tuner 22 receiving a signal, for example, from an antenna 21, and transposing its frequency to intermediate frequencies intended for a subsequent video amplifier 23 and an audio amplifier 24.

The IF audio amplifier 24 is followed by a demodulator 29 which supplies the audio signals in the baseband to an audio output amplifier 27 feeding a loudspeaker 33. The IF video amplifier 23 is followed by a unit 25 which supplies a video signal in the baseband to a video amplifier 26 supplying the signals ad hoc to the electrodes of a cathode ray tube 32. The unit 25 also extracts synchronizing signals from the signal, these synchronizing signals being applied to a field scanning circuit 28 and a line scanning circuit 36. The field or "vertical" scanning circuit 28 supplies a current in a field deflection coil 30. The line scanning circuit is provided with a line output stage 35 which supplies a current in a line deflection coil 34 and produces a voltage, referred to as EHT, of approximately 25 kV for supplying the screen of the display tube to which it is connected via a connection 31. The line output stage 35 is fed via a connection V1 by a power supply 14 of, for example, the cut-off type, connected to the line voltage. As is common practice, the other circuits 22–29 are fed from the line output stage 35 by means of connections which are not shown so as to simplify the Figure. A tele-control receiver 13 is connected to the line scanning circuit 36 by means of a connection RC for controlling the stop or the start, which respectively involves the standby state or the operative state of the parts of the set which are fed by the line output stage 35.

Figure 2:
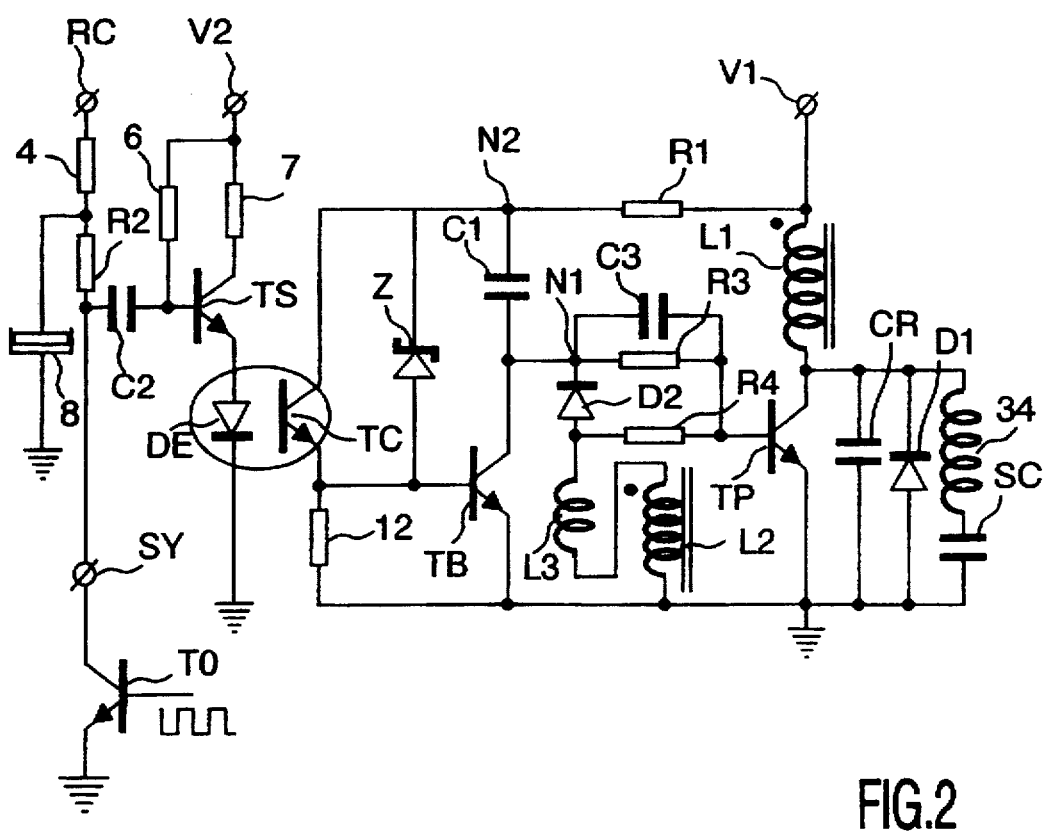
FIG. 2 is a diagram of a device according to the invention.

The device shown in FIG. 2 comprises a power transistor TP of the NPN type in this case, which acts in known manner as a switch for the current for the deflection coil 34. As is also known, the deflection coil is connected in series with a capacitance SC, referred to as S capacitance, and a recovery diode D1 as well as a retrace capacitor CR are arranged in parallel with the power transistor TP. An EHT transformer comprises, in known manner, a primary winding and a plurality of secondary windings. Only the primary winding L1 is shown, which is connected between the collector of the power transistor TP and the power supply terminal V1 having a positive voltage in this case of, for example, about one hundred volts. This voltage is supplied by the line voltage supply 14 shown in FIG. 1. It is thus DC coupled to the line voltage.

A base current is applied to the transistor TP by means of an arrangement comprising, in cascade starting from a voltage reference point which is the ground in this case:

- a winding L2 which is a winding of the EHT transformer which is thus coupled magnetically to the winding L1 and is connected in a direction indicated by dots at the corresponding ends of L1 and L2, so that it supplies a positive voltage suitable for rendering the power transistor TP conducting during the trace period,
- an inductance L3 which is not coupled magnetically to the other inductances, and
- a diode D2 whose forward direction allows passage of the base current of TP and whose cathode is connected to a junction point N1.

The end of the arrangement L2+L3+D2, i.e., the junction point N1, is connected to the base of the power transistor TP by means of an assembly consisting of a resistor R3 in parallel with a capacitance C3.

A resistor R4 is also connected between the common point of the inductance L3 and the diode D2, on the one hand, and the base of the power transistor TP, on the other hand. If for any reason the blocking of transistor TP is not controlled within the prescribed time, the current will continue to increase until the transistor TP is desaturated, at which instant, the current will stop increasing, which reduces the voltage in L2 and thus the base current. The phenomenon is cumulative and the transistor will be turned off. This turn-off is strengthened by the retrace overvoltage in L2, which is transmitted to the base of TP via the resistor R4.

A transistor TB of the NPN type, referred to as blocking transistor, which is intended to turn away the base current of the power transistor so that it is turned off, connects, to this end, the junction point N1 to ground. The inductance L3, already mentioned above, serves to limit the current in the transistor TB when the voltage at the terminals of L2 is positive, although the transistor TP is turned off, during the conducting phase of the diode D1.

From the power supply terminal V1, a resistor R1 is connected at N2 to the collector of a transistor TC of the NPN type, referred to as control transistor, whose emitter supplies a current to the base of the blocking transistor TB, while a resistor 12 between the base and the emitter of the latter transistor facilitates its blocking when the transistor TC is turned off. A zener diode Z is connected between the common point N2 and the base of TB in a direction such that it does not short-circuit TC during normal operation. In the case of a failure in the control for rendering TC conducting, or in the case of an overvoltage of the power supply, the voltage will increase at N2 until the diode Z is rendered conducting and consequently the transistor TP is turned off.

A capacitance connects the point N2 to the collector of transistor TB, i.e., eventually to the base of the transistor TP, via C3-R3. The transistor TC itself is alternately turned on and off via a circuit for generating line synchronizing signals, in a manner as described below. The capacitance C1 is partly discharged during the simultaneous conductance of transistor TC and transistor TB, which allows it to subsequently supply, temporarily, at the instant when the transistors TC and TB are turned off, a current in the base of the power transistor so as to initiate its self-triggering.

The control transistor TC is the receiver transistor of an opto-coupler in which the emitter diode DE is fed by a transistor TS whose collector is connected via a resistor 7 to a power supply V2 which remains present when the apparatus is in the standby state (this is a voltage which is supplied in known manner by a winding insulated from the line voltage in the power supply 14 of FIG. 1). The base of transistor TS is connected by means of a polarizing resistor 6 to the voltage source V2 and, via a capacitance C2, to a terminal SY which is an output of an integrated circuit supplying a square-wave line synchronizing signal. The resistor 6 has such a value that in the absence of a control via the capacitance C2, the transistor TS is saturated.

Said integrated circuit is, for example, a member of the series known as TDA 8360. It comprises several of the elements of FIG. 1 and supplies, inter alia, a line frequency signal. This signal is supplied from an open collector output, which is indicated by means of a transistor TO in the Figure.

A terminal RC conveys a run/standby signal originating from the remote control receiver circuit. The signal at the terminal RC is, for example, +5 volts when the apparatus is operative, and decreases to zero volt when the apparatus is put in the standby state. The terminal RC is connected to an integrator circuit consisting of a resistor 4 followed by a capacitance 8 connected to ground. The output of the integrator circuit, i.e., the common point of the resistor 4 and the capacitance 8, is connected to the output SY by means of a resistor R2.

The operation is as follows: in the normal operative state, the voltage at RC is high, the collector of the transistor TO charged by the resistor R2 conveys a line synchronizing signal, which is a square-wave signal in this case, and is transmitted by means of the capacitance C2 to the base of transistor TS. During the periods of the square-wave signal when the voltage is low at SY, the capacitance C2 is charged via the resistor 6 and the voltage increases again at the base of transistor TS. The values chosen for these elements are such that, in normal operation, the voltage increases to an almost sufficient extent but not a completely sufficient extent to render the transistor TS conducting before the increase of the square-wave signal at SY. If, for any reason, there were no synchronization by TO within the desired period of time, this phenomenon would provoke the conductance of TS and the blocking of TP by the time the current would increase dangerously.

When the standby state is initiated, the voltage drops to zero at the terminal RC, the active plate of the capacitor 8, i.e., the "cold" point of the resistor R2, is progressively brought to zero and the amplitude of the pulses at SY is reduced progressively until it is eliminated. When this amplitude is being reduced, the increase of the voltage at the base of TS, due to the charging of the capacitance C2 mentioned above, renders the transistor TS conducting at an earlier instant, which renders the power transistor TP non-conducting at an earlier instant so that its conducting time is reduced progressively and, consequently, the amplitude of the deflection current in the deflection coil 24 and the EHT are also reduced.

A reciprocal phenomenon occurs when the voltage returns to 5 volts at the terminal RC. A progressive stop and start of the line sweep is then obtained. The values of the resistor 4 and the capacitance 8 allow adjustment of the respective periods of time when the transistor TS is turned on and off.

It will be evident that variants are possible, notably for the circuit controlling the opto-coupler, and that any other known assembly with which the transistor TB can be rendered conducting with a duty factor varying progressively during the transitions of the run/standby signal is also suitable.

I claim:

1. A picture display apparatus provided with a cathode ray tube (32) and a device for generating a sawtooth current in a beam deflection coil, and for producing, by means of a transformer, different voltages required for the apparatus, said device comprising, for supplying the deflection coil current, a bipolar power transistor having a base current which is automatically maintained by a positive feedback provided by a winding of the transformer connected in such a sense that the winding supplies a voltage to the base of the power transistor which is suitable for increasing its conductance when the power transistor is already conducting, and is diverted so as to render the power transistor non-conducting by means of an element, referred to as blocking element, which is alternately rendered conducting and non-conducting by a line frequency signal, characterized in that the apparatus comprises an integrator circuit having an input which is connected to a terminal which conveys a run/standby signal, and an output which conveys a voltage varying progressively during a transition of the value of the run/standby signal and is connected to an assembly which, as a function of said output voltage, varies the duty factor of the line frequency signal which controls the blocking elements.

2. An apparatus as claimed in claim 1, characterized in that the blocking element comprises a main current path of a transistor, referred to as a blocking transistor, controlled by said line frequency signal, and extends between the base of the power transistor and a voltage reference point.

3. An apparatus as claimed in claim 2, characterized in that the base of the blocking transistor is connected to an emitter of a transistor, referred to as control transistor, which is controlled by a line frequency signal, said control transistor having a collector connected, via a first resistor, to a power supply source and, a first capacitance connecting the collector of the control transistor to the base of the power transistor.

4. An apparatus as claimed in claim 3, characterized in that the apparatus comprises an opto-coupler having a receiver transistor, which constitutes said control transistor, and an emitter diode which is fed with said line frequency signal.

5. An apparatus as claimed in claim 4, characterized in that the emitter diode is fed by another transistor having a base connected, by means of a second capacitance, to a source supplying a square-wave line frequency signal having an amplitude which is variable as a function of the value of the run/standby signal.

6. An apparatus as claimed in claim 5, characterized in that said square-wave line frequency signal having an amplitude which is variable as a function of the value of the start/stop signal is obtained at an open collector output of a line synchronizing signal generator, said open collector output being connected, by means of a second resistor, to the output of the integrator circuit.

7. An apparatus as claimed in claim 1, characterized in that the base current of the power transistor is supplied by an arrangement having one end connected to a voltage reference point and comprising, in cascade, said transformer winding, an inductance and a diode.

8. An apparatus as claimed in claim 7, characterized in that the other end of said arrangement is connected to the base of the power transistor by means of an assembly consisting of a third resistor in parallel with a third capacitance.

9. An apparatus as claimed in claim 8, characterized in that, with one of the terminals of the diode being connected to the third resistor, a fourth resistor is connected between the other terminal of the diode and the base of the power transistor.

* * * * *